United States Patent [19]

Fairbanks

[11] 4,297,539
[45] Oct. 27, 1981

[54] TELEPHONE SECURITY ATTACHMENT

[76] Inventor: Thomas L. Fairbanks, 2443 34th St., Santa Monica, Calif. 90405

[21] Appl. No.: 125,033

[22] Filed: Feb. 27, 1980

[51] Int. Cl.³ .............................................. H04M 1/66
[52] U.S. Cl. .............................. 179/189 D; 179/90 D
[58] Field of Search ............ 179/189 R, 189 D, 90 D, 179/6.3 R, 6.5, 18 DA

[56] References Cited

U.S. PATENT DOCUMENTS

| | | | |
|---|---|---|---|
| 3,495,050 | 2/1970 | Bart | 179/189 R |
| 3,624,317 | 11/1971 | Buckingham et al. | 179/189 D |
| 3,860,762 | 1/1975 | Klaiber et al. | 179/18 DA |
| 3,866,000 | 2/1975 | Gillis | 179/189 D |
| 4,005,279 | 1/1977 | Richter | 179/189 D |
| 4,028,508 | 6/1977 | Hall | 179/189D |
| 4,081,630 | 3/1978 | Washburn et al. | 179/189 R |

Primary Examiner—Gerald L. Brigance
Attorney, Agent, or Firm—William H. Maxwell

[57] ABSTRACT

A security attachment removably locked to a telephone instrument base without interfering with the use of the hand-set, and comprised of an integral construction adapted to be hooked to spaced front and cradle features of the base and having a planar portion overlying the dial of the instrument and with an at least one aperture therein, for limited dialing.

3 Claims, 4 Drawing Figures

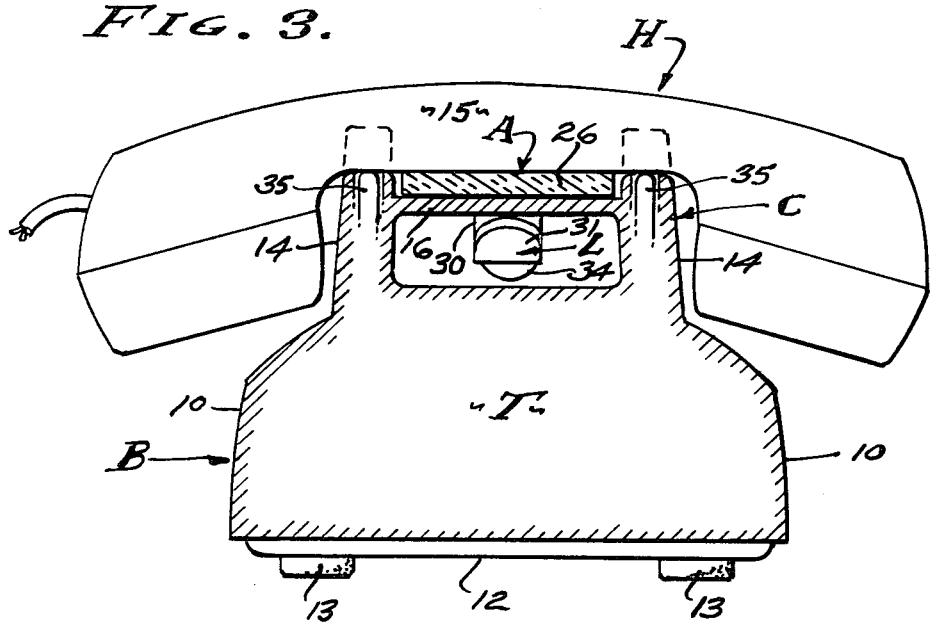
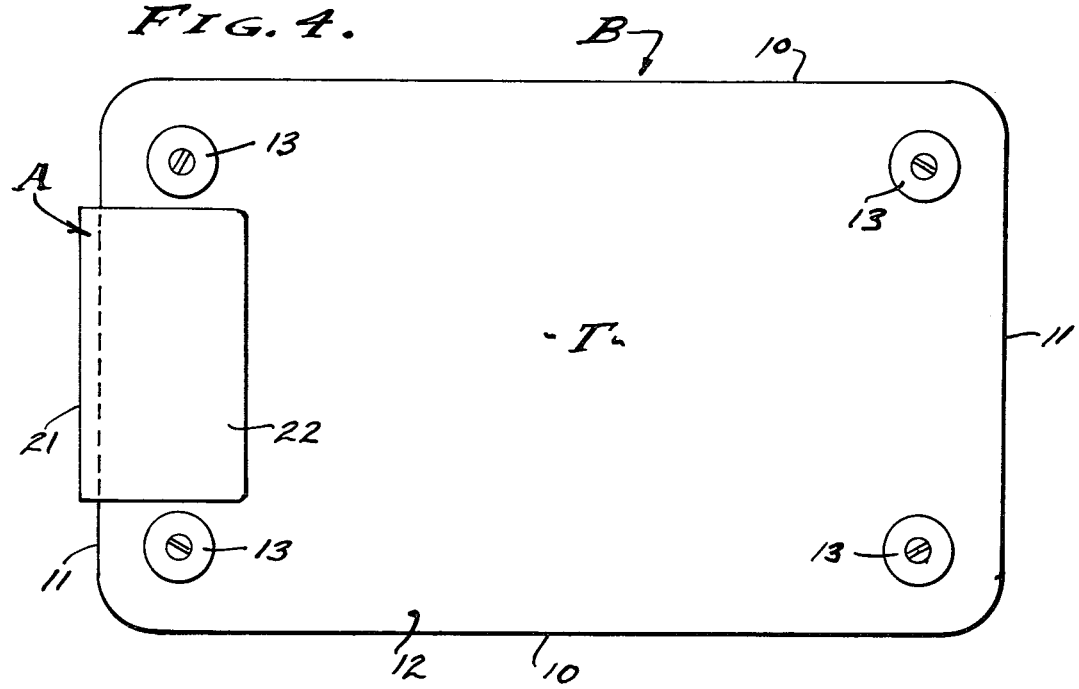

TELEPHONE SECURITY ATTACHMENT

BACKGROUND

The subscriber to a telephone system has the responsibilities that go with the instrument put into his possession, which not only involves the safe keeping of the instrument but the payment for its use. That is, the calls which are made from a service telephone are monitored and the subscriber is billed therefor dependent upon the number of calls and the distances involved etc. As a practical matter there are many subscribers who are at a decided disadvantage in this respect, as they have no effective way to prevent unauthorized calls from the phone service which they supposedly control. Reference is made to the many situations where a telephone is unattended by the subscriber and thereby made available to unauthorized persons who are prone to take advantage of the situation. For instance, there are places of business which must be left open to the public and where it is necessary for the subscriber to have a telephone in order to conduct business, it being impossible to guard such a telephone at all times. Consequently, unauthorized persons are prone to take advantage of such a subscriber and utilize the telephone to make expensive phone calls, unknown to the subscriber. It is such unauthorized calls with which the present invention is concerned, it being a general object to secure a telephone instrument so that it cannot be employed to make unauthorized calls.

The telephone instrument involves a base and a hand-set that normally rests upon the base when not in use. In the resting position, the hand-set opens a switch that disconnects the instrument from the telephone system. The telephone instrument is characterized by a dial by which selective combinations of numbers can be imposed upon the system in order to complete a call to another telephone and it is an object of this invention to render such a dial inaccessible and inoperable by means of a removable attachment to the instrument and which can be locked into place thereon by the subscriber.

A prerequisite of making and receiving a telephone call is the lifting of the receiver or hand-set, by which a normally open switch is closed by means of releasing plungers exposed within the recesses of the cradle provided as a resting place on the base. Since it is an object of this invention to restrict calls to those which are authorized, it is also an object to permit lifting of the hand-set under all circumstances to both receive and to make certain restricted calls.

The present state of the art telephone instrument involves a digital push button dial that is characterized by several rows of buttons, or touch plates, representing the numbers one (1) to nine (9) and zero (0), and/or the letters "A" through "Z" of the alphabet. Also buttons for additional telephonic functions. For example, a typical dial format involves three rows of four buttons each, offering two button functions in addition to the numerical and letter systems. Accordingly, it is an object of this invention to render a push button dial inaccessible by said removable means that can be locked to the telephone instrument when circumstances require it.

The availability of a telephone instrument is often imperative for emergency situations, and though unauthorized calls are not to be permitted, nevertheless a person may be in dire need to use a telephone for legitimate reasons such as to call the police, the fire department or an ambulance etc. Therefore, it is another object of this invention to provide a removable security attachment that can be locked into position over the dial with the exposure of certain buttons which are reserved for emergency calls only. In this respect, at least seven digits must be used to place an ordinary call, and as many a four more digits for long distance calls. However, the communications systems have adopted a universal code call involving one or two digits and presently for example the digits one (1) and nine (9), using the number combination nine-one-one, or "911", a number used to complete an emergency call. It is another object therefore to provide the ability to make an emergency code call, even though all other calls are made impossible. With the present invention, there is an attachment that is removeably locked onto the base of the telephone instrument, to cover the dial while permitting normal use of the hand-set which actuates the operational switch that connects the instrument into the telephone system.

SUMMARY OF THE INVENTION

This invention relates to the protection of telephone instruments against unauthorized use, where such instruments are otherwise unprotectable. There are situations where there is no facility to remove a telephone from access to unauthorized persons, outdoor phones and the like, but where answering and emergency calls therefrom may become a necessity. And to these ends the present invention provides a removable attachment that is locked onto the instrument when use thereof is to be restricted by the subscriber. The telephone instrument involves a base having a dial and a cradle for the hand-set. The attachment of the present invention secures to the base of the telephone instrument and overlies the dial and spans the cradle area without interfering with the seating of the hand-set and closing and opening of the receiver switch thereby. In practice, the cradle is centrally located and disposed transversely of the base, having upwardly open recesses into which an elongated handle of the hand-set seats. An actuating plunger projects from each recess to be depressed by the hand-set rested therein to open the telephone circuit. A characteristic feature of such instruments is the rearwardly open hand-hold shelf that extends between the cradle recesses, and by which the base of the instrument can be conveniently lifted by hand. Another feature is the forwardly declined face of the dial which extends to the front of the instrument that depends vertically to the horizontally bottom thereof. Still another feature is the four corner pads which support the base above the plane of a supporting surface.

The aforesaid characteristics of the base are those which are advantageously employed by the present invention to secure the attachment thereto and prevent operation of the dial, and namely the digital buttons thereof. In carrying out this invention there is an attachment that embraces the front and top operative portions of the telephone instrument, an attachment that hooks under the bottom front portion of the base and that hooks over the shelf between the cradle recesses, and all without interfering with the hand-set which must necessarily rest in the cradle in order to depress the switch actuating plungers. A feature is the overlying planar configuration of the attachment, and with an aperture therein to expose at least one digital control button of the instrument, and preferably two predetermined numbered buttons thereof whereby a certain coded emergency call can be made.

The foregoing and other various object and features of this invention will be apparent and fully understood from the following detailed description of the typical preferred form and application thereof, throughout which description reference is made to the accompanying drawings.

DESCRIPTION OF THE DRAWINGS

FIG. 3 is a transverse sectional view taken as indicated by line 3—3 on FIG. 1.

FIG. 4 is a bottom plan view taken as indicated by line 4—4 on FIG. 1.

PREFERRED EMBODIMENT

Figure 1:
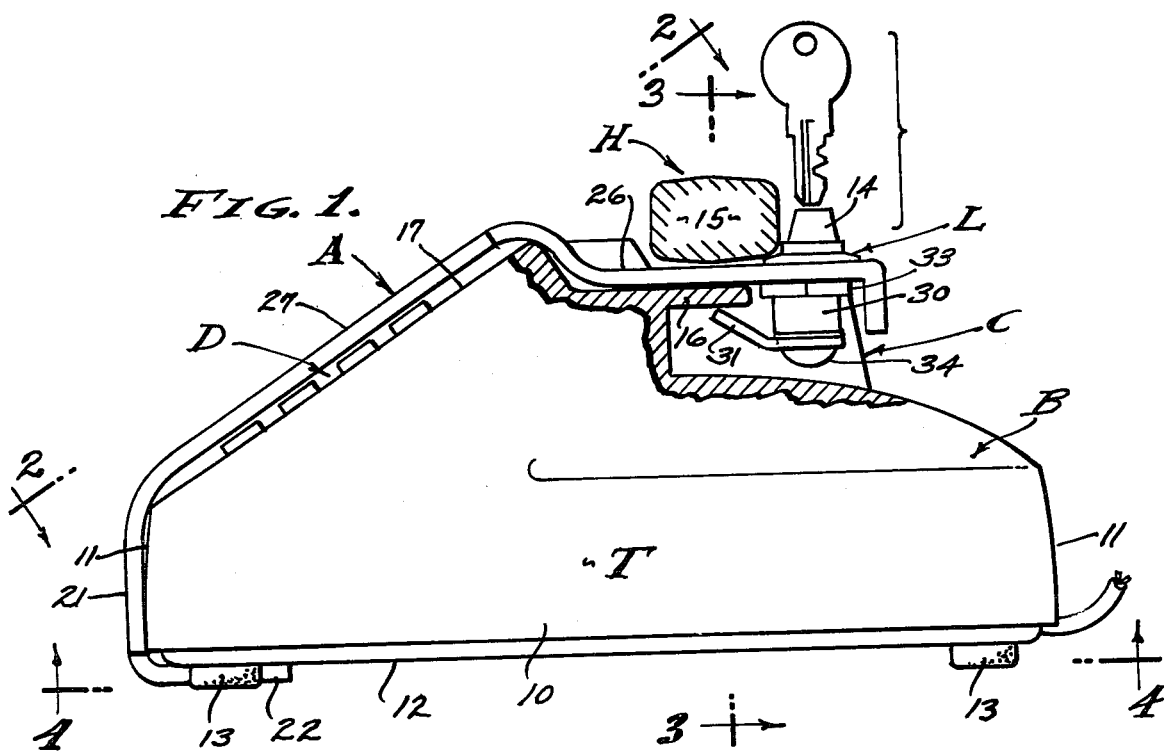
FIG. 1 is a side elevation of a complete telephone instrument with the security attachment of the present invention installed thereon.
Figure 2:
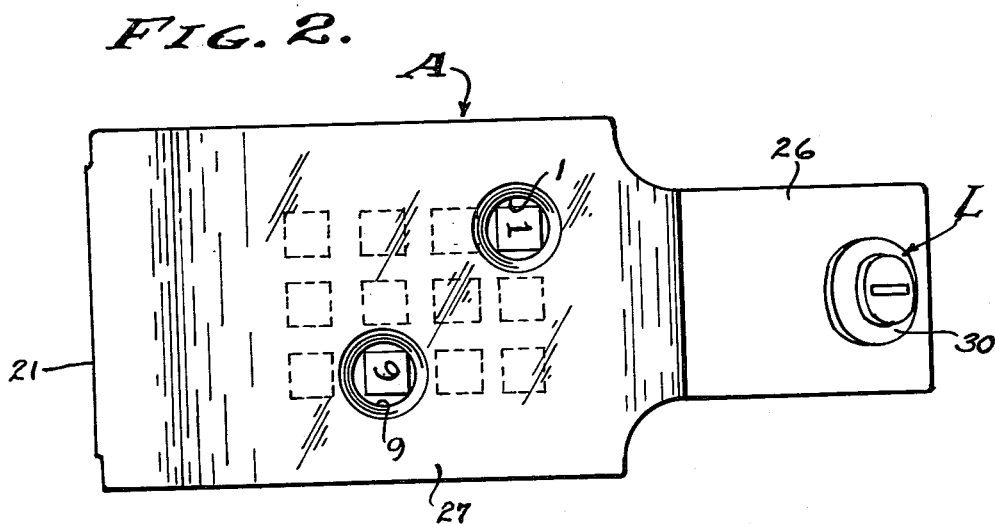
FIG. 2 is a view of the attachment as it appears removed from the telephone instrument as taken as indicated by line 2—2 on FIG. 1.

Referring now to the drawings, the telephone instrument T is shown to have a base B with a cradle C for the support of a hand-set H, and a dial D. The attachment A of the present invention is shown in its embracing engagement of the base B and secured thereto by a lock means L and with a portion overlying the dial to restrict and limit the use thereof. A typical telephone instrument T and hand-set H is shown, it being understood that the features and proportioning thereof will vary.

The base B of the telephone instrument is rectangular with side walls 10 and end walls 11 that are upstanding from a bottom 12 spaced from a supporting surface by corner pads 13. Midway of the base there is the upstanding cradle C with laterally spaced upwardly open recess members 14 to support the elongated handle 15 of the hand-set H when it is rested transversely therein. Intermediate the recesses there is a hand-hold shelf 16, the top surface of which is below the plane of support established by the cradle recess members, for the support of the hand-set. The shelf 16 defines a rearwardly open pocket between the upstanding recess numbers, and the planar shelf 16 extends forwardly to the face 17 of dial D which declines forwardly to the front end 11 of the base. The face 17 is flat and presents push buttons for dialing as next described.

The push button dialing system shown is digital and involves several rows of buttons, or touch plates, and preferably three vertical rows of four buttons each; numbers one (1) to nine (9) and zero (0); and two additional special feature buttons. As is common practice, the buttons can also include alphabetical indicia (not shown). This push button format is rectangular and is centrally located on the dial face 17. As shown, the shelf 16 drops below the plane of support for the hand-set H, and the dial D rises to the top extremity of the cradle recess members 14.

In accordance with this invention, the attachment A features an integral body of clear plastic that is embraceably locked onto the base B, having portions thereof overlying the front end 11 and with an extension 22 hooked beneath the bottom 12, the dial face 17 and the shelf 16. Although the fitting of these portions over their respective base features is non-critical, the dial portion 27 is characteristically held spaced from the dial face 17 by means of the engagement of end portion 21 and bottom portion 22 with said complementary portions of the base; and also by means of the engagement of the shelf portion 26 with the shelf 16 of the base. In practice, the attachment portions 21, 22 and 26 are closely fitted to the complementary features of the base, so as to ensure said spaced positioning of the dial portion 27 so that it clears the aforesaid buttons projecting from the dial face 17; alternately from a projecting rotary dial.

In carrying out this invention, the lock means L is provided on the shelf portion 26 as it rests upon the shelf 16 and projects rearwardly therefrom to carry the lock means barrel 30 offset from the cradled portion of the hand-set H. The lock barrel 30 extends through the shelf portion 26 and depends therefrom on a vertical axis immediate to the rear edge of shelf 16, the key slot thereof being exposed upwardly. The lower terminal end of the barrel rotatably carries a lock arm 31 operable from a laterally disposed release position to a forwardly disposed lock position; positioned by means of a key as indicated. As shown, the lock arm 31 is releasably engageable under the shelf 16 while the barrel 30 engages against the rear edge of the shelf 16. Accordingly, the attachment A is releasably locked in operating position with the portion 27 overlying the dial face 17.

Referring now to the lateral placement of the attachment A; the bottom portion 22 thereof engages between the bottom pads 13 at the front end of the base, while the top shelf portion 26 thereof engages between the cradle recess members 14 which define spaced shoulders at the junctures with the shelf 16.

Referring now to the limited access of buttons one (1) through nine (9) etc. for making restricted calls; finger apertures or openings 1 and 9 register over complementary and indentifiable push buttons on the dial D when the attachment A is in its locked working position as shown.

From the foregoing it will be seen that the attachment A is readily adapted to and that the free use of the telephone instrument is restricted thereby. However, the limited use of certain numbered buttons remains. In practice, a clear plastic is used for construction, molded or otherwise fabricated with the features herein disclosed, and the nut 33 and tumbler screw 34 made inaccessible as they are recessed and placed so as to avoid engagement by tools, and so that the attachment lock cannot be removed when the device is installed on the instrument base B. The switch plungers 35 also remain operable by the hand-set H resting thereon, and all to the end that the telephone can be answered and only limited calls can be made.

Having described only a typical preferred form and application of my invention, I do not wish to be limited or restricted to the specific details herein set forth, but wish to reserve to myself any modifications or variations that may appear to those skilled in the art as set forth within the limits of the following claims.

I claim:

1. A security attachment for restricting the use of a telephone comprised of a base and a liftable hand-set, the base having a hand-set cradle and a dial extending forwardly from the cradle to the front end of the base and comprised of a plurality of push buttons representing the digits "0" through "9"; the attachment including integral planar body portions overlying the cradle and dial and front end of the base, the overlying front portion having an extension with hooked engagement beneath a bottom of the base, the body portion overlying the cradle being engageable with the cradle of the base, and the body portion overlying the dial being held in spaced relation from the dial on the base and having at least one finger aperture therethrough for access to a push button, there being lock means carried by the cradle portion of the attachment to releasably hook with the cradle of the base in opposition to said hooked engagement of the front portion.

2. The telephone security attachment as set forth in claim 1, wherein the said overlying dial portion of the attachment has two finger apertures therethrough for access to a pair of code identifiable push buttons for completing authorized calls.

3. The telephone security attachment as set forth in claim 1, wherein a shelf extends transversely of the base between laterally spaced and upwardly open recesses of the cradle and spaced below the supporting plane of said recesses that receive the hand-set, wherein the planar overlying shelf portion of the attachment lies within the spaced recesses and upon the shelf of the base whereby the hand-set is received by said spaced cradle recesses, wherein the lock means engages a rear edge of the shelf of the base and includes an arm releasably engageable beneath said shelf of the base, and wherein the said overlying dial portion of the attachment having two finger apertures therethrough for access to a pair of code indentifiable push buttons for completing authorized calls.

* * * * *